United States Patent [19]

Barnett

[11] Patent Number: 4,752,826
[45] Date of Patent: Jun. 21, 1988

[54] INTRA-FIELD RECURSIVE INTERPOLATOR

[75] Inventor: Ronnie D. Barnett, Nevada City, Calif.

[73] Assignee: The Grass Valley Group, Inc., Grass Valley, Calif.

[21] Appl. No.: 920,559

[22] Filed: Oct. 20, 1986

[51] Int. Cl.$^4$ .......................... H04N 7/12; H04N 5/14
[52] U.S. Cl. .................................... 358/140; 358/140; 358/136; 358/160; 340/720
[58] Field of Search .............. 358/140, 136, 160, 166, 358/167; 340/728; 375/33; 364/723, 724; 382/54

[56] References Cited

U.S. PATENT DOCUMENTS

| | | | |
|---|---|---|---|
| 4,058,836 | 11/1977 | Drewery et al. | 358/167 |
| 4,494,140 | 1/1985 | Michael | 358/167 |
| 4,639,784 | 1/1987 | Fling | 358/167 |
| 4,646,138 | 2/1987 | Willis | 358/167 |
| 4,675,733 | 6/1987 | Tanimoto | 358/136 |

Primary Examiner—James J. Groody
Assistant Examiner—John K. Peng
Attorney, Agent, or Firm—Francis I. Gray

[57] ABSTRACT

An intra-field recursive interpolator reads stored output video from one field store while writing output video into a second field store. The read stored output video is spatially corrected by vertical interpolation prior to being multiplied by a decay constant and being combined with an input video which has been multiplied by the inverse of the decay constant to produce the output video. The resulting output video is a combination of the current input field of video and each preceding field of the output video.

9 Claims, 1 Drawing Sheet

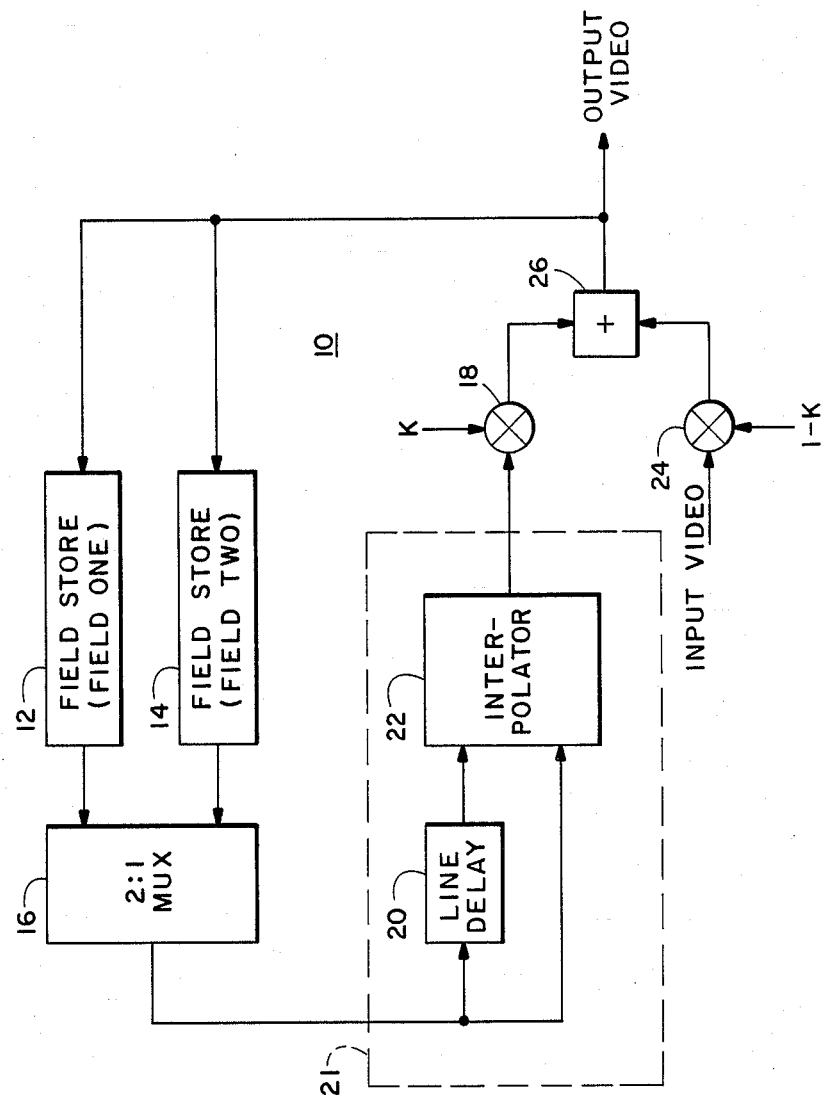

INTRA-FIELD RECURSIVE INTERPOLATOR

BACKGROUND OF THE INVENTION

The present invention relates to recursive effects devices, and more particularly to an intra-field recursive interpolator which interpolates between a current field and an opposite interlaced field only one field old.

In recursive video effects devices new video is mixed with old video to implement effects such as decay, picture trails, etc. This is accomplished by multiplying the old video, which is stored in a field store, by a decay constant between zero and unity. The new video is multiplied by the inverse of this decay constant and added to the old video as modified by the decay constant. A unity value for the decay constant yields a frozen picture, i.e., all old video, and a zero value yields no effect, i.e., all new video. In an interlaced television system the field of the stored video which is multiplied by the decay constant is combined with the corresponding field of the new video, i.e., with video which is two fields old. What is desired is the implementation of recursive effects which combines the stored video with video which is only one field old, i.e., the opposite interlaced field.

SUMMARY OF THE INVENTION

Accordingly the present invention provides a recursive interpolator having two field stores which alternately store successive fields of video. The outputs of the field stores are input to a multiplexer which selects between the two outputs. The output of the multiplexer is input to a line delay circuit and to an interpolator, with the output of the line delay circuit also being input to the interpolator. The output of the interpolator is mixed with a decay constant and combined with new video which has been mixed with the inverse of the decay constant to produce the output video. The output video is fed back to the two field stores to complete the recursive loop.

The objects, advantages and novel features of the present invention will be apparent from the following detailed description when read in conjunction with the appended claims and attached drawing.

BRIEF DESCRIPTION OF THE DRAWING

The FIGURE is a block diagram of an intra-field recursive interpolator according to the present invention.

DESCRIPTION OF THE PREFERRED EMBODIMENT

Referring now to the FIGURE an intra-field recursive interpolator 10 is shown having an input interlaced video and an output interlaced video. The output video is input to one of two field stores 12, 14 alternately, i.e., one field of the output video is stored in field store one 12, the next field of the output video is stored in field store two 14, the third field of the output video is stored in field store one, etc. The outputs of the field stores 12, 14 are input to a multiplexer 16 which selects one field store for reading stored video data from while the other field store is having a field of the output video written into it. Instead of inputting the output of the multiplexer 16 directly into a multiplier 18, the output of the multiplexer is input to a line delay circuit 20 and to an interpolator 22. The output of the line delay circuit 20 is also input to the interpolator 22 which produces an average of consecutive lines of video from the frame store, 12 or 14. The averaged output of the interpolator 22 is multiplied by a decay constant, k, having a value between zero and one. The input video is multiplied by the inverse of the decay constant, 1−k, in multiplier 24. The outputs of the multipliers 18, 24 are combined by a summing circuit 26 to produce the output video which is fed back to the field stores 12, 14 to complete the recursive loop.

Table I shows the output video and contents of the field stores 12, 14 without the line delay circuit 20 and interpolator 22 assuming that for the first two fields, F0 and F1, of input video the decay constant is zero. Table I illustrates that when data from television field one, i.e., the even fields, is input to field store one 12, field store two 14 is neither being written into nor read from. Likewise when data from television field two, i.e., the odd fields, is input to field store two 14, field store one 12 is neither being written into nor read from. Therefore, field store one 12 contains only even field data and field store two 14 contains only odd field data.

TABLE I

| Input | Field Store One | Field Store Two |
|---|---|---|
| F0 | F0 | N/A |
| F1 | F0 | F1 |
| F2 | /k*F2 + k*F0 | F1 |
| F3 | /k*F2 + k*F0 | /k*F3 + k*F1 |
| F4 | /k*F4 + /k*k*F2 + k²*F0 | /k*F3 + k*F1 |
| F5 | /k*F4 + /k*k*F2 + k²*F0 | /k*F5 + /k*k*F3 + k²*F1 |
| F6 | /k*F6 + /k*k*F4 + /k*k²F2 + k³F0 | /k*F5 + /k*k*F3 + k²*F1 |
| F7 | /k*F6 + /k*k*F4 + /k*k²F2 + k³F0 | /k*F7 + /k*k*F5 + /k*k²F3 + k³F1 | where $/k = 1 - k$.

With the interpolation circuit 21 in the recursive loop the equations for the output video and the contents of the field stores 12, 14 are shown in Table II, assuming that F0 is input as a full field video.

TABLE II

| Input | Field Store One | Field Store Two |
|---|---|---|
| F0 | F0 | N/A |
| F1 | F0 | /k*F1 + {I(k*F0)} |
| F2 | /k*F2 + {I(/k*k*F1 + k²*F0)} | /k*F1 + {I(k*F0)} |
| F3 | /k*F2 + {I(/k*k*F1 + k²*F0)} | /k*F3 + {I(/k*k*F2 + /k*k²*F1 + k³*F0)} |
| F4 | /k*F4 +(I(/k*k*F3 + /k*k²*F2 + /k*k³*F1 + k²*F0)} | /k*F3 + {I(/k*k*F2 + /k*k²*F1 + k³*F0)} |

As shown in Table II each field store has contributions from each preceding field, including two field old video data from the same television field and one field old video data from the opposite television field. The capital "I" in these equations indicates that the video data within the brackets is the vertically interpolated version of this video data.

The interpolation permits the opposite field video data to have the same spatial position as the input video data. This is accomplished by delaying the stored video data one line in the line delay circuit 20 and averaging the delayed line of video data with the next line of video data output from the appropriate field store 12, 14 in the interpolator 22. This averaged video data is the spatially corrected video data which is coincident with the incoming video data. The second line of stored video data is input to the line delay circuit 20 as the first line is being read from the line delay circuit so that the averaging occurs continuously.

Thus the present invention provides an intra-field recursive interpolator which combines opposite television fields to produce recursive effects by writing output video data into one field store while reading video data from a second field store, the stored video data from the second field store being vertically interpolated and combined with the input video data to produce the output video data.

What is claimed is:

1. An intra-field recursive interpolator having an input interlaced video and producing an output interlaced video comprising:
    a recursive loop for storing the output video for subsequent combination with the input video; and
    means for interpolating the output video stored in the recursive loop and combining the interpolated output video with the opposite field of the input video to produce the output video.

2. An intra-field recursive interpolator as recited in claim 1 wherein the interpolating means comprises means for continuously averaging a current line with the next line of the stored output video from the recursive loop prior to combining the stored output video with the input video to produce the output video.

3. An intra-field recursive interpolator as recited in claim 2 wherein the averaging means comprises:
    means for delaying each line of the stored output video; and
    means for combining each line of the stored output video with the output of the delaying means to produce a vertically interpolated version of the stored output video which is subsequently combined with the input video to produce the output video.

4. An intra-field recursive interpolator as recited in claim 1 wherein the recursive loop comprises:
    means for storing a current field of the output video while reading from the storing means a prior, one field old, field of the ouput video; and
    means for multiplying the prior field of the output video by a decay constant prior to combination with the input video to produce the output video.

5. An intra-field recursive interpolator as recited in claim 4 wherein the storing means comprises:
    a first and a second field store into which alternate fields of the output video are written such that even fields of the output video are written into one of the field stores and odd fields of the output video are written into the other field store; and
    means for selecting the output of one of the field stores for input to the multiplying means, the selected field store being read from while the other field store is being written into.

6. An intra-field recursive interpolator as recited in claim 5 further comprising means for multiplying the input video with an inverse of the decay constant prior to combination with the stored output video to produce the output video.

7. An intra-field recursive interpolator as recited in claim 6 wherein the recursive loop further comprises means for adding the outputs of the two multiplying means to produce the output video.

8. An intra-field recursive interpolator as recited in claim 5 wherein the interpolating means comprises:
    means for delaying each line of the stored output video from the selecting means; and
    means for combining each line of the stored output video from the selecting means with the output of the delaying means to produce a vertically interpolated version of the stored output video for input to the multiplying means.

9. An improved recursive effects device of the type wherein alternate fields of an output interlaced video are stored alternately in a pair of field stores, the stored output video being multiplied by a decay constant and combined with an input interlaced video which has been multiplied by the inverse of the decay constant to produce the output video, the improvement comprising:
    means for reading a prior, one field old, field of the output video from one of the field stores while writing a current field of the output video into the other field store; and
    means for vertically interpolating the stored output video from the reading means prior to multiplication by the decay constant so that the stored output video is spatially corrected for combination with the input video.

* * * * *